United States Patent [19]

Allan et al.

[11] Patent Number: 5,274,545
[45] Date of Patent: Dec. 28, 1993

[54] DEVICE AND METHOD FOR PROVIDING ACCURATE TIME AND/OR FREQUENCY

[75] Inventors: David W. Allan; Judah Levine; Dicky D. Davis; Marc A. Weiss, all of Boulder, Colo.

[73] Assignee: The United States of America as represented by the Secretary of Commerce, Washington, D.C.

[21] Appl. No.: 864,167

[22] Filed: Apr. 3, 1992

Related U.S. Application Data

[63] Continuation of Ser. No. 471,764, Jan. 29, 1990, abandoned.

[51] Int. Cl.$^5$ .............................................. G04G 5/00
[52] U.S. Cl. ................................. 364/148; 368/156; 368/200; 368/202; 968/906; 968/907
[58] Field of Search ................. 371/61; 368/47, 156, 368/200, 202; 364/900, 569, 148, 149, 150; 968/900, 906, 907, 910, 911, 913

[56] References Cited

U.S. PATENT DOCUMENTS

| | | | |
|---|---|---|---|
| 2,786,972 | 3/1957 | Dreier et al. | 368/47 |
| 3,590,573 | 7/1971 | Dietsch | 368/47 |
| 3,811,265 | 5/1974 | Cater | 368/48 |
| 3,881,310 | 5/1975 | Gerum et al. | 368/47 |
| 3,974,457 | 8/1976 | Bates et al. | 331/43 |
| 4,020,628 | 5/1977 | Vittoz | 368/4 |
| 4,117,661 | 10/1978 | Bryant, Jr. | 368/47 |
| 4,187,518 | 2/1980 | Martin et al. | 368/47 |
| 4,254,494 | 3/1981 | Maeda | 368/200 |
| 4,282,595 | 8/1981 | Lowdenslager et al. | 368/200 |
| 4,290,130 | 9/1981 | Lowdenslager et al. | 368/200 |
| 4,315,332 | 2/1982 | Sakami et al. | 368/47 |
| 4,407,589 | 10/1983 | Davidson et al. | 368/200 |
| 4,440,501 | 4/1984 | Schulz | 368/47 |
| 4,448,543 | 5/1984 | Vail | 368/202 |
| 4,473,303 | 9/1984 | Suzuki | 368/202 |
| 4,501,502 | 2/1985 | Van Orsdel | 368/47 |
| 4,513,259 | 4/1985 | Frekking | 368/202 |
| 4,525,685 | 6/1985 | Hesselberth et al. | 368/47 |
| 4,575,848 | 3/1986 | Moore et al. | 371/61 |
| 4,582,434 | 4/1986 | Plangger et al. | 368/47 |
| 4,602,375 | 7/1986 | Inukai | 375/109 |

(List continued on next page.)

OTHER PUBLICATIONS

"In Search of the Best Clock", M. A. Weiss, D. W. Allan and Trudi K. Peppler, Apr., 1989.
"An Ultra-Precise Time Synchronization System Designed by Computer Simulation", D. W. Allan, L. Fey, H. E. Machlan, and J. A. Barnes, Jan. 1986.
"A Study of the NBS Time Scale Algorithm", M. A. Weiss, D. W. Allan and Trudi K. Peppler, Apr. 1989.
"An Analysis of a Low Information Rate Time Control Unit", Lowell Fey, James A. Barnes, and David W. Allan, Apr. 1966.

(List continued on next page.)

Primary Examiner—Thomas C. Lee
Assistant Examiner—Matthew C. Fagan
Attorney, Agent, or Firm—Harris & Burdick

[57] ABSTRACT

A device and method provide for an accurate output from a unit, such as an oscillator and/or clock providing an output indicative of frequency and/or time. The device includes a processing section having a microprocessor that develops a model characterizing the performance of the device, including establishing predicted accuracy variations, and the model is then used to correct the unit output. An external reference is used to provide a reference input for updating the model, including updating of predicted variations of the unit, by comparison of the reference input with the unit output. The ability of the model to accurately predict the performance of the unit improves as additional updates are carried out, and this allows the interval between the updates to be lengthened and/or the overall accuracy of the device to be improved. The accuracy of the output is thus adaptively optimized in the presence of systematic and random variations.

24 Claims, 8 Drawing Sheets

U.S. PATENT DOCUMENTS

| | | | |
|---|---|---|---|
| 4,633,421 | 12/1986 | Watson, Jr. et al. | 364/569 |
| 4,633,422 | 12/1986 | Brauer | 364/569 |
| 4,708,491 | 11/1987 | Luitje | 368/200 |
| 4,768,178 | 8/1988 | Conklin et al. | 368/47 |
| 4,803,708 | 2/1989 | Momose | 364/200 |
| 4,899,117 | 2/1990 | Vig | 368/202 |
| 4,903,251 | 2/1990 | Chapman | 368/200 |
| 4,921,467 | 5/1990 | Lax | 368/200 |
| 4,993,003 | 2/1991 | Fechner et al. | 368/47 |

OTHER PUBLICATIONS

"Time and Frequency (Time-Domain) Characterization, Estimation, and Prediction of Precision Clocks and Oscillators", David W. Allan, Nov. 1987.

"Control Of The Frequency And Phase Of An Atomic-Clock By An External Reference", Stein et al., International Conference on Frequency Control and Synthesis, University of Surrey, Guildford: Apr. 7-10, 1987.

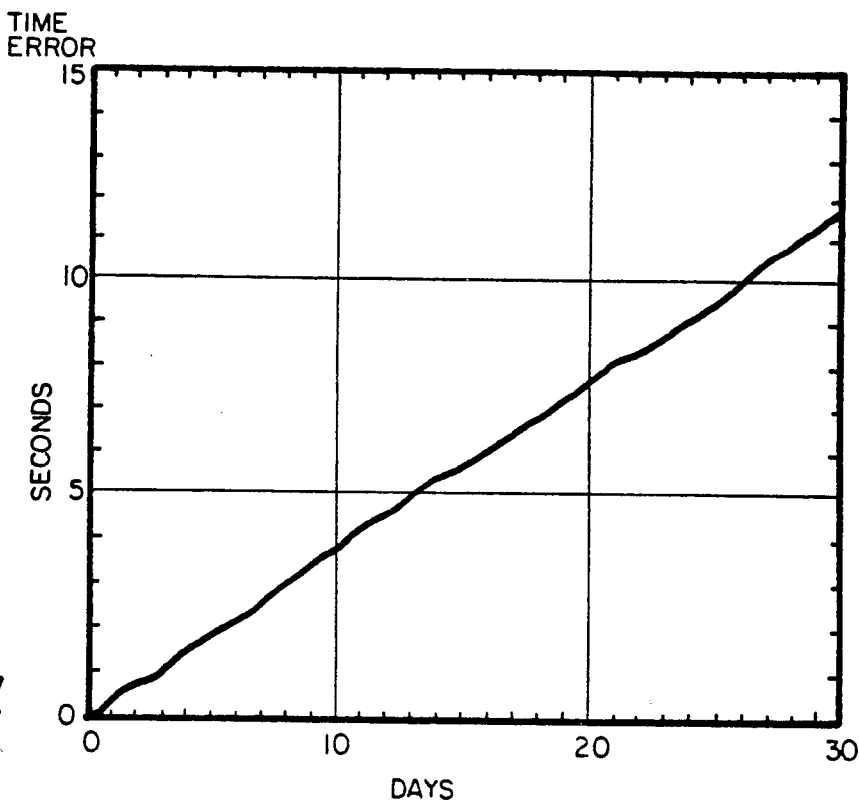
Fig_1
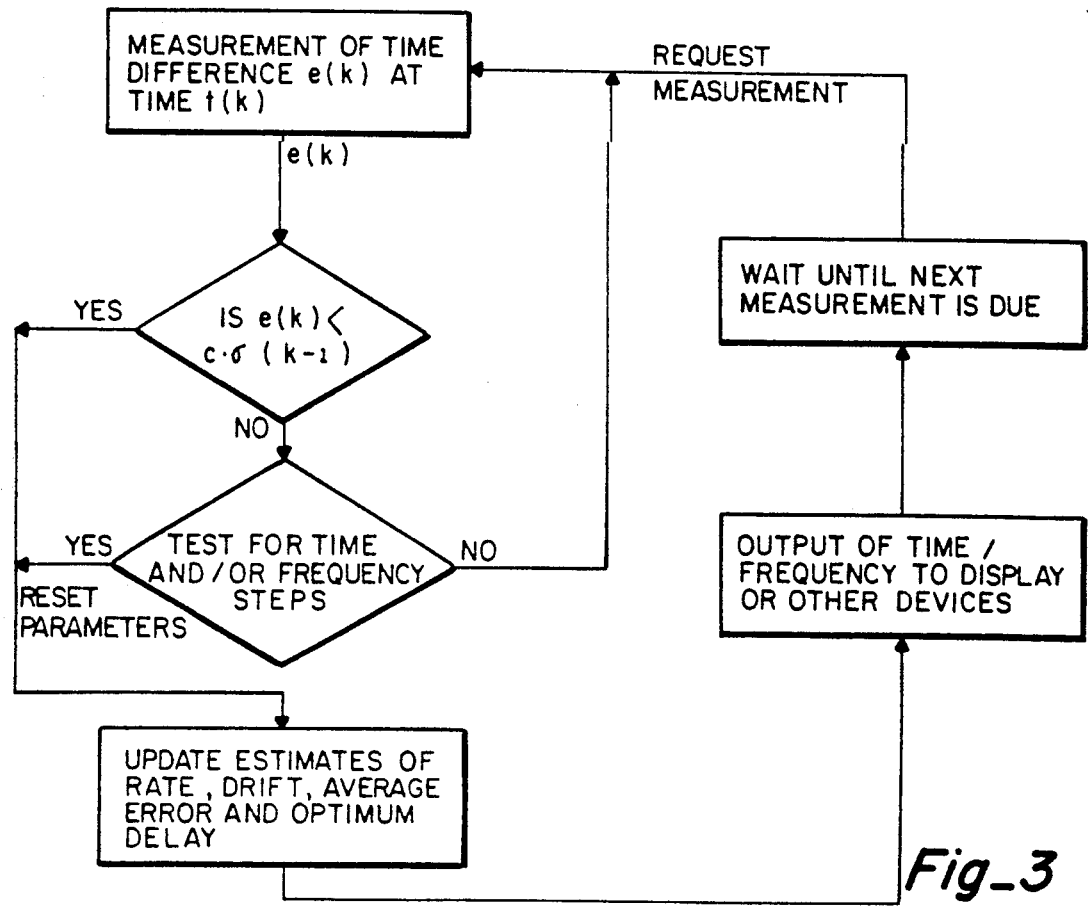
Fig_3

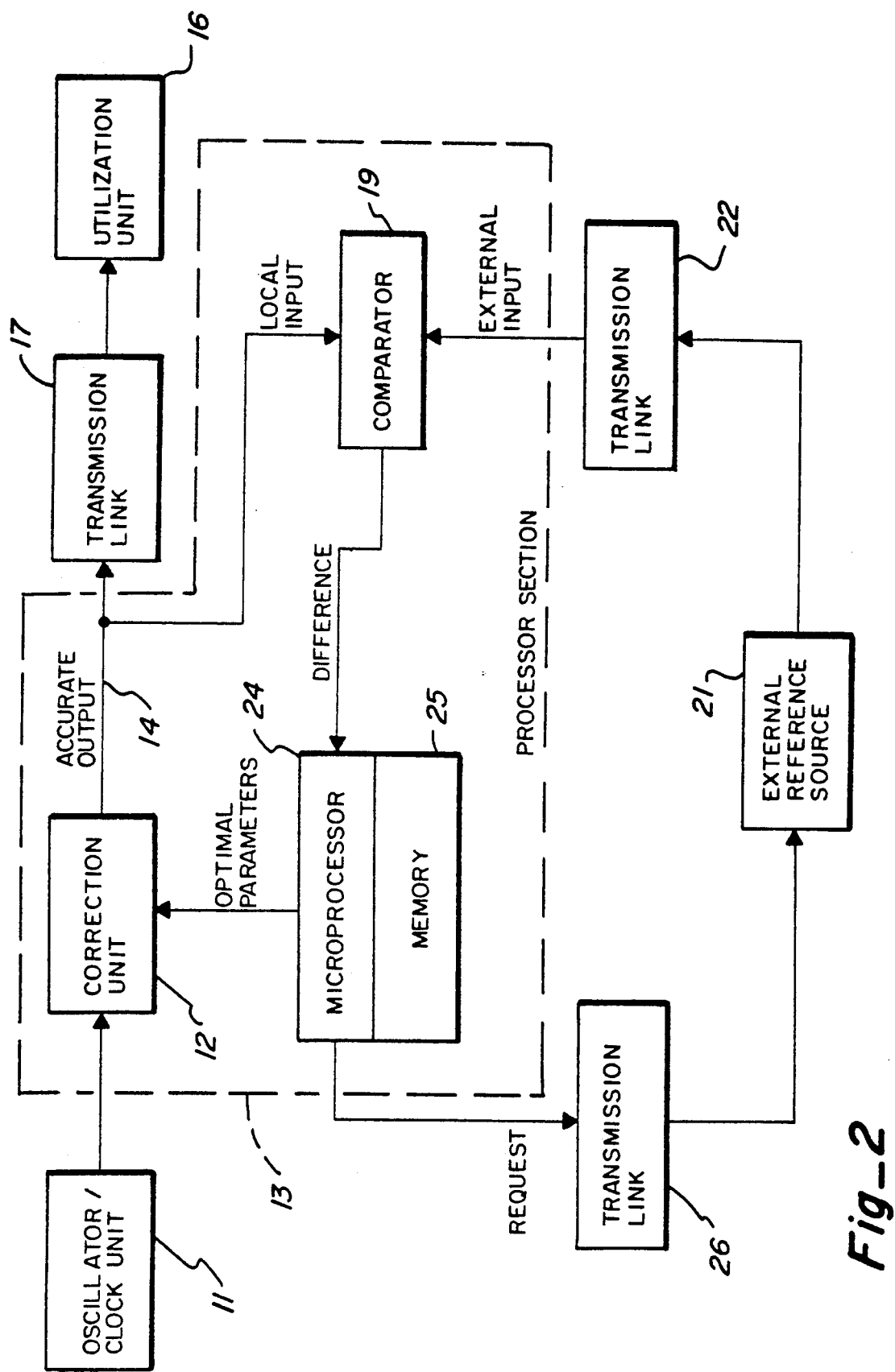
Fig_2

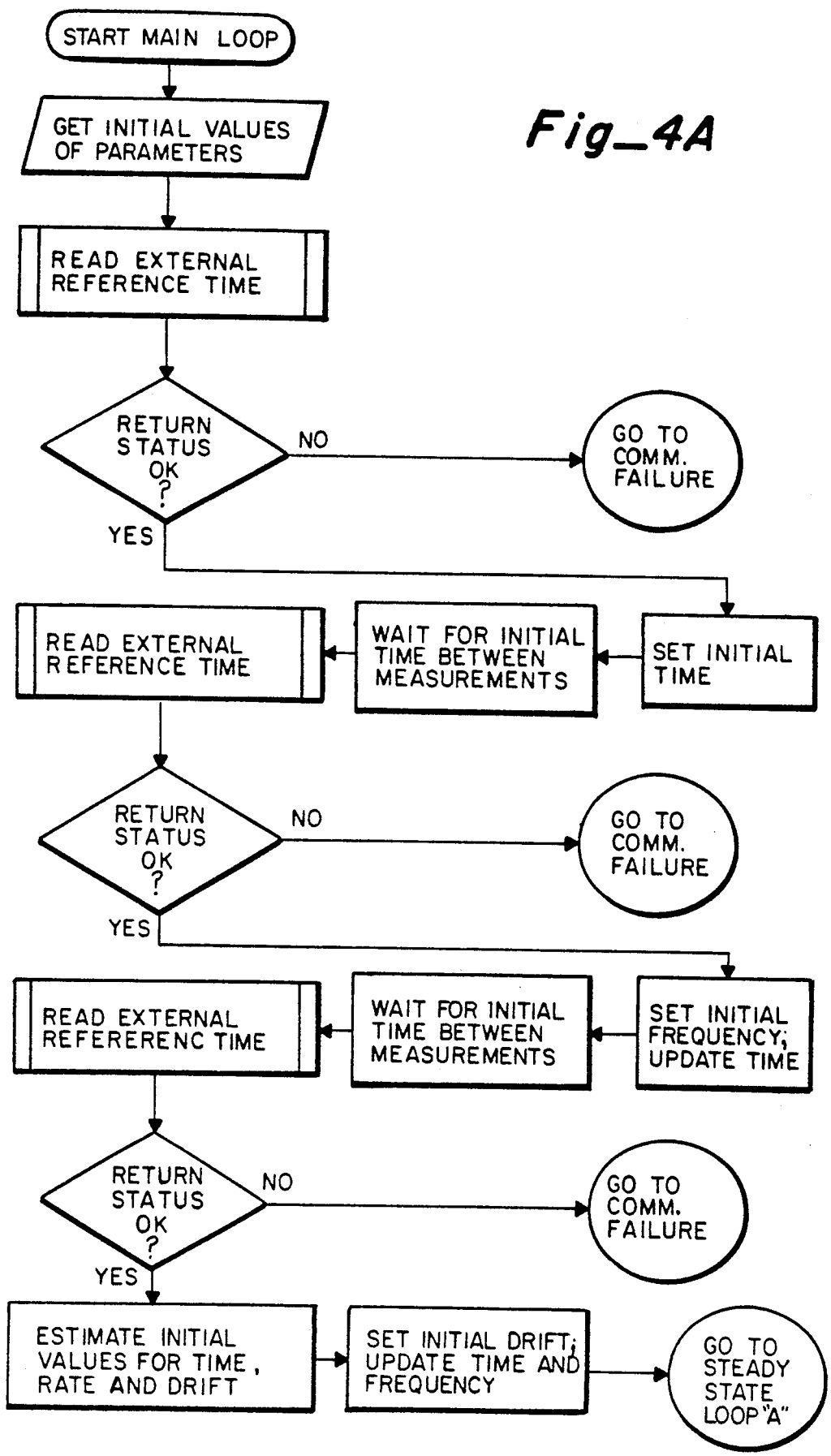
Fig_4A

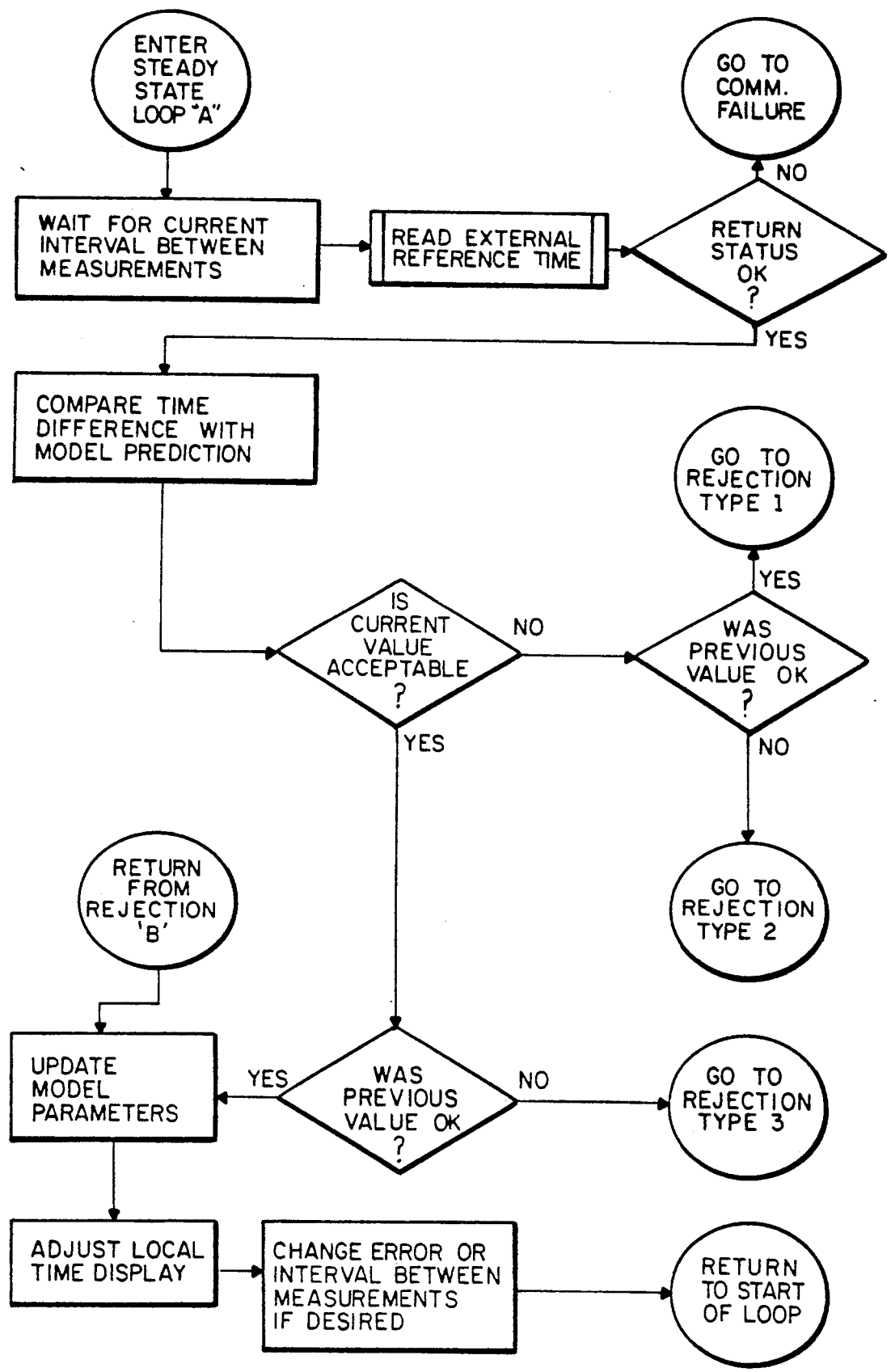
Fig_4B

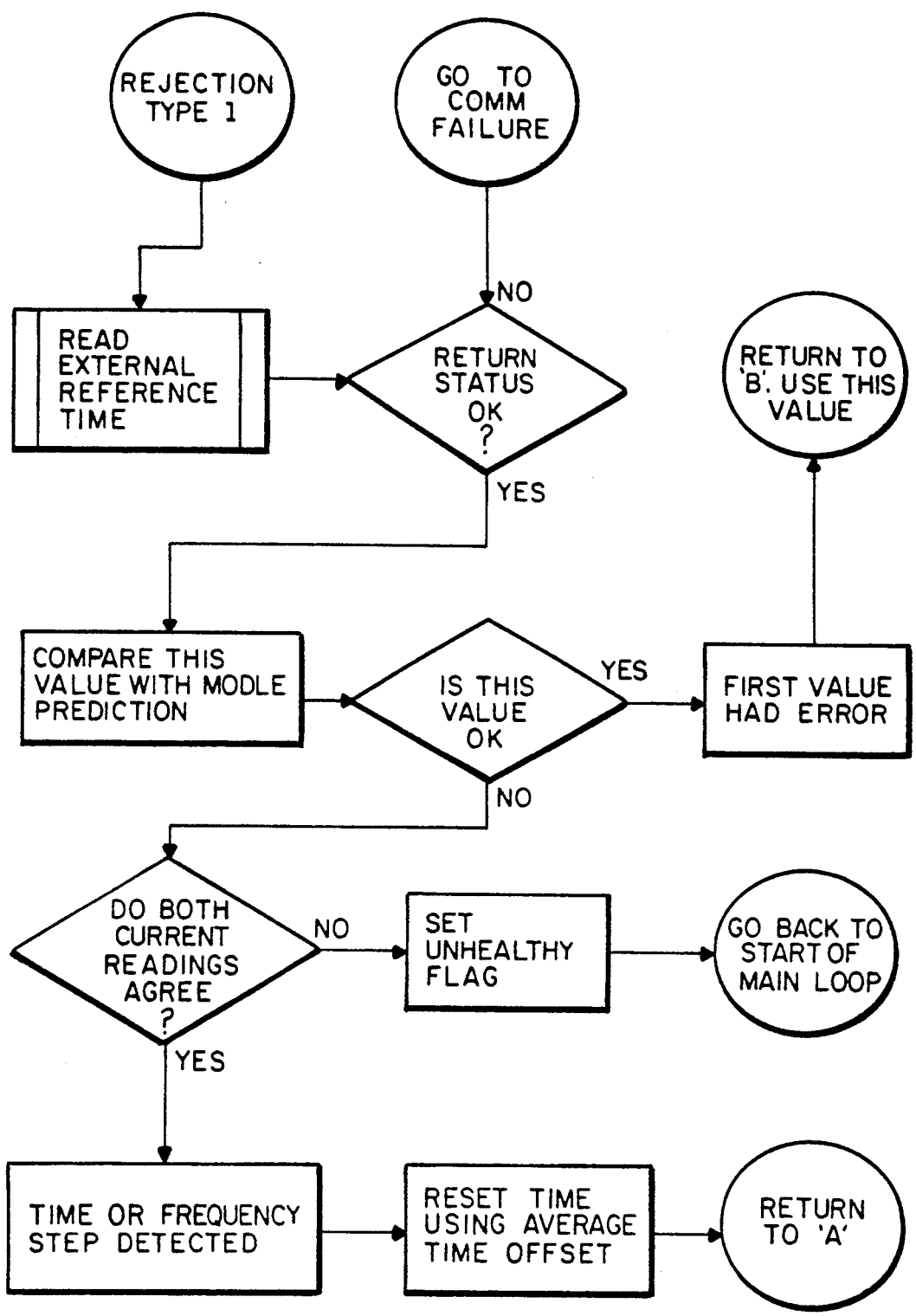
Fig_4C

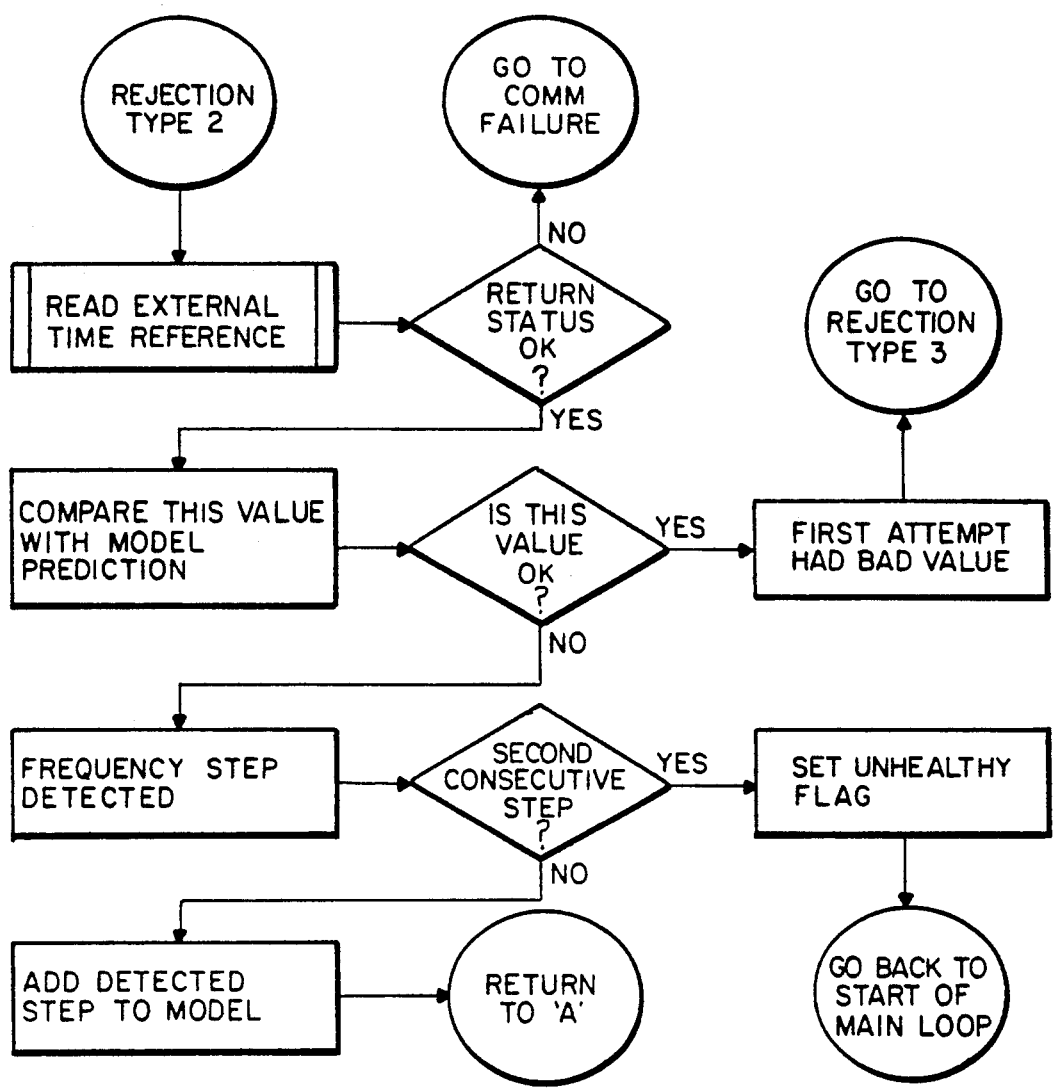
Fig_4D
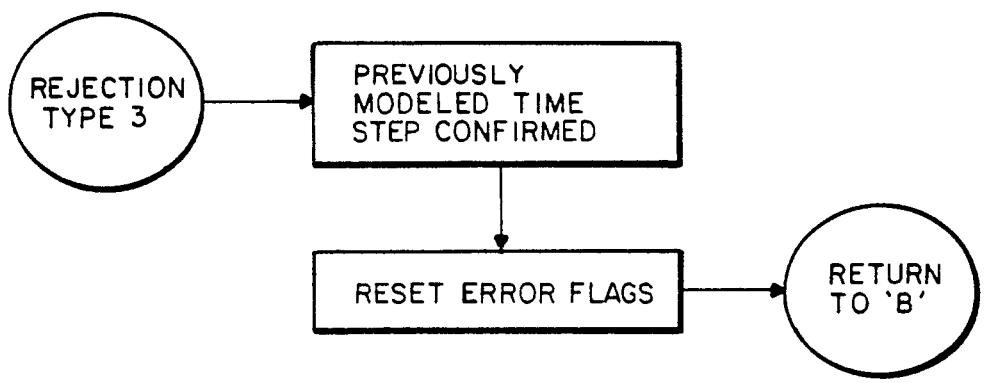
Fig_4E

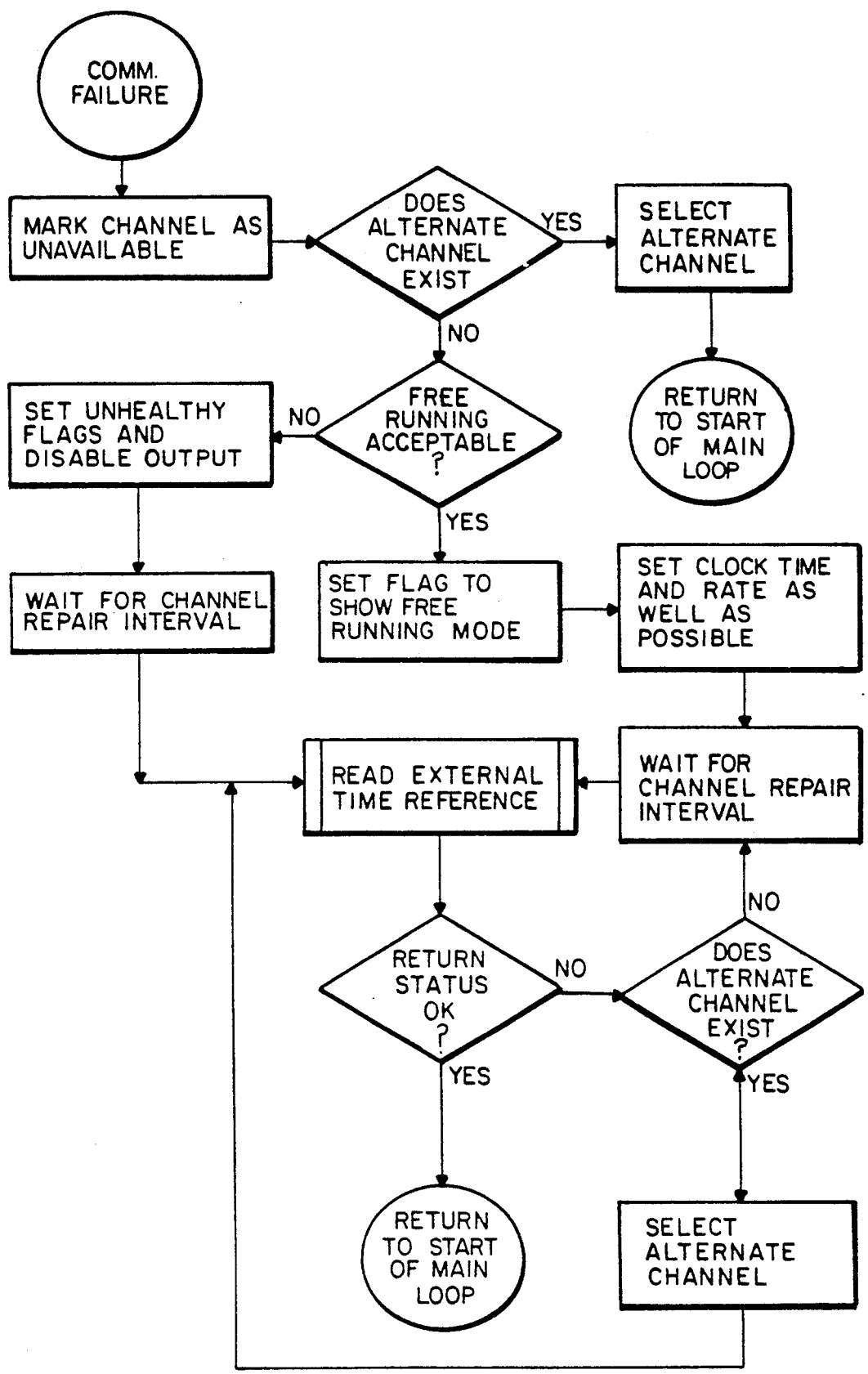
Fig_4F

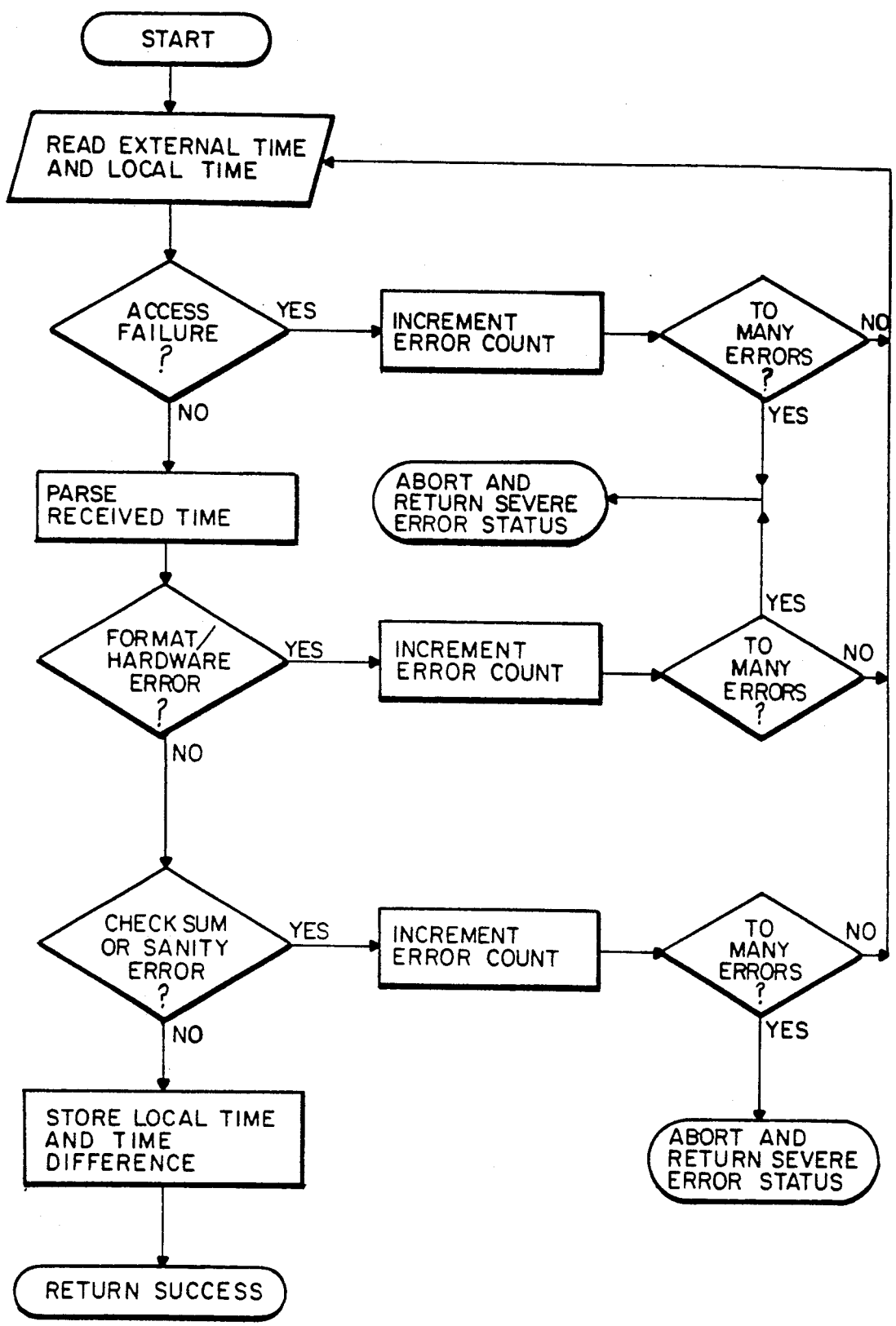
Fig_4G

DEVICE AND METHOD FOR PROVIDING ACCURATE TIME AND/OR FREQUENCY

RELATED APPLICATION

This application is a File Wrapper Continuation of application Ser. No. 07/471,764 filed on Jan. 29, 1990 entitled "Device and Method For Providing Accurate Time And/Or Frequency", now abandoned.

FIELD OF THE INVENTION

This invention relates to a device and method for enhancing the accuracy of a unit such as an oscillator and/or clock, and, more particularly, relates to a device and method for providing accurate time and/or frequency.

BACKGROUND OF THE INVENTION

It is well known that oscillators and/or clocks will, over time, produce outputs having frequency and/or time accuracy errors.

Any two independent clocks, for example, once synchronized, will walk away from one another without bound, and the difference between them will exceed any limit given enough elapsed time. Improvements in the performance of a clock unit may slow this process but will not eliminate it.

One method for maintaining agreement between two clock (or oscillator) units involves a continuous, or nearly continuous, communication between them. This is inconvenient and impractical in general, and most clocks, for example, are periodically reset (using correct time from an external reference) to maintain synchronism. Although the two clock units agree each time the reset is performed, the clock readings walk away from one another between resets.

Some systems attempt to correct for clock error, for example, by using an estimate of the clock rate difference. None of the heretofore known methods of either periodic clock reset or the use of static rate offset, however, optimally utilize the information available to construct a statistically robust model of the performance of the actual clock in its environment and they are therefore much less efficient than they could be.

Errors due to time offset, frequency offset, frequency drift, clock noise and external perturbations all contribute to inaccuracies of an oscillator/clock unit output between calibrations, or updates, and existing processes provide no means for assessing the accuracy of output readings during these intervals.

SUMMARY OF THE INVENTION

This invention provides a device and method for providing an accuracy enhanced unit output based upon utilization of established predictions of output variations, which predictions are updated based upon a reference. Where the unit is an oscillator and/or clock, the reference may be indicative of correct frequency and/or time, with the reference being preferably supplied from an external source, or standard. Updating of the variation predictions may be carried out as needed for a particular purpose, and normally can be more infrequent as the predictions of output variations improve.

For a frequency and/or time accuracy enhanced unit, the device preferably includes an oscillator/clock unit the output of which is continuously monitored and controlled by a processor section, which processor section preferably includes a microprocessor. The microprocessor may be utilized to supply corrections to the oscillator/clock unit, or a separate microprocessor-controlled correction unit, such as a servo system, may be utilized.

In addition, the microprocessor may be utilized to compare the oscillator/clock unit output to a reference for updating predictions, or a separate microprocessor-controlled comparison system may be utilized. The comparisons against the reference (an external standard) are used to develop measures of performance of the internal oscillator/clock unit, to provide information to the continuous correction unit and to provide a continuous statistically robust estimate of the errors of the device.

It is therefore an object of this invention to provide an improved device and method for enhancing the accuracy of the output of a unit.

It is another object of this invention to provide an improved device and method for enhancing the accuracy of a unit output by establishing and using predicted variations based upon past performance of the unit.

It is still another object of this invention to provide an improved device and method for enhancing the accuracy of a unit output by establishing and using predicted variations based upon past performance of the unit and updating the predicted variations utilizing comparisons between the unit output and an external reference.

It is still another object of this invention to provide an improved device and method for accurately generating time and/or frequency using predicted variations based upon the past performance of an oscillator/clock unit and updating the predicted variations utilizing comparisons between the output of the oscillator/clock unit and a correct reference indicative of the correct frequency/time.

It is still another object of this invention to provide an improved device and method for enhancing the accuracy of the output of a unit wherein only infrequent reference to an external standard is required.

It is still another object of this invention to provide an improved device and method for enhancing the accuracy of the output of a unit by providing a continuous statistically robust estimate of unit errors derived from the calibration history and an internally constructed model.

With these and other objects in view, as the description proceeds, it will become apparent to one skilled in the art that this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for practical application of the principles thereof, and in which:

FIG. 1 is a graph illustrating time and frequency (slope of the curve) accuracy, or error, of a typical quartz-crystal oscillator/clock unit;

FIG. 2 is a block diagram illustrating an example of the device of this invention;

FIG. 3 is a flow chart illustrating an example of an algorithm used in the microprocessor shown in FIG. 2; and FIGS. 4A, 4B, 4C, 4D, 4E, 4F, and 4G provide a more detailed example of an algorithm used in the microprocessor shown in FIG. 2.

DESCRIPTION OF THE INVENTION

If environmental perturbations are neglected, it is well known that the systematic time offsets of many types of clocks are well modeled by a quadratic function:

$$x(t) = x_0 + y_o*t + 0.5*D*t^2, \quad (1)$$

where $x_0$ represents the error in synchronization at $t=0$, $y_o$ represents the clock rate or frequency offset at $t=0$ and D represents the modeled frequency drift rate.

Again neglecting environmental perturbations, it is also well known that the actual random deviations of time offset from the predictions of equation (1) are generally characterized by a power spectrum of the form:

$$S_y(f) = \sum_{\alpha=-2}^{+2} h_\alpha * f^\alpha, \quad (2)$$

where y is the normalized frequency offset of the oscillator, the $h_\alpha$ parameters characterize the strength of each of the five particular noise process models, and f is the Fourier frequency.

In the long term, the deviations of typical quartz-crystal oscillators are usually characterized by flicker noise frequency modulation (FM) and often also by a random walk FM, and equation (2) may be simplified in this case:

$$S_y(f) = h_{-1}/f + h_{-2}/f^2 \quad (3)$$

where $h_{-1}$ and $h_{-2}$ are the measures of the power from each FM process.

As set forth in an article entitled, "An Analysis of a Low Information Rate Time Control Unit" by L. Fey, J.A. Barnes and D.W. Allan, which appeared in the Proceedings of the Twentieth Annual Symposium on Frequency Control, pages 629-635 (1966), and in an article entitled, "An Ultra-Precise Time Synchronization System Designed by Computer Simulation" by D.W. Allan, L. Fey, H.E. Machlan and J.A. Barnes, which appeared in Frequency, pages 1-5 (1968), a third-order servo controlled from a very low information rate input (very small bandwidth requirement) has heretofore been developed for use in providing a correction input to improve clock accuracy (both of these articles are hereby included by reference). As a part of that work, the behavior characterized by equations (1) and (3) was simulated in a digital computer to optimize the servo time constants in the presence of flicker noise—a problem that cannot be solved analytically.

The servo stability criteria were also checked with an analogue computer. As is set forth in the above referenced article, "An Ultra-Precise Time Synchronization System Designed by Computer Simulation", the device worked well and would predict time over a twelve hour period with a root-mean-square (RMS) error of 70 ns (nanoseconds). The device only needed information for 1 second every 12 hours to acquire the time difference and to update the coefficients in equation (1).

In this invention, correction of the unit utilized, such as an oscillator/clock unit, may be effected by a correction unit that includes a servo such as is set forth in the above-referenced articles, "An Analysis of a Low Information Rate Time Control Unit" and "An Ultra-Precise Time Synchronization System Designed by Computer Simulation", or may be implemented by the microprocessor (by software and/or firmware). The flicker FM and the random-walk FM are modeled at appropriate levels for each in order to optimize a digital servo algorithm for the continuous correction of a clock. The servo can be tailored to the characteristics of the oscillator and can run as a second-order, third-order or higher-order loop.

FIG. 1 illustrates the time error of a typical clock controlled by a quartz-crystal oscillator, and FIG. 2 illustrates a block diagram of the device of this invention.

As shown in FIG. 2, oscillator/clock unit 11, for example a quartz crystal oscillator, a rubidium frequency standard oscillator, a cesium frequency standard oscillator or a hydrogen maser oscillator, provides an output (at 32,768 Hz, for example), to correction unit 12, which unit is a part of processor section 13. The output of the device (for example, a pulsed, continuous frequency, coded time, analog, digital, or modulated output signal), on line 14, is provided to a utilization network, for example utilization unit 16, which unit may be external to the device and is connectable thereto by a conventional transmission link 17. Utilization unit 16 may be, for example, a display, broadcast transmitter, or a time and/or frequency metrology unit.

The output, on line 14, is also coupled to comparator 19, which compares the output, on line 14, with a reference input (such as correct time, for example) provided by external reference source 21. As indicated, the reference input can be coupled to comparator 19 through a conventional transmission link 22.

The difference output from comparator 19 is coupled to microprocessor 24 for updating of the predicted variations of the associated unit. Microprocessor 24 implements a correction algorithm, and the difference outputs received from comparator 19, along with the algorithm parameters and other relevant values, are stored in memory 25.

Microprocessor 24 continually computes an updated correction to be supplied to correction unit 12 to further correct the time signal, on output line 14, and also may compute the desired time at which the next calibration is to be requested from time reference source 21 to maintain a given accuracy level. As also indicated in FIG. 2, when an update is needed, such update may be initiated by microprocessor 24 issuing a request through transmission link 26 to external reference source 21.

The corrections computed by microprocessor 24 comprise an optimum prediction of needed clock corrections derived from the current and past performance of the device as modeled by equations (1) and (2) and may also include corrections estimated from a measurement of environmental perturbations, such as, for example, due to a temperature or supply voltage.

Processing Section 13, as shown in FIG. 2, can be realized as several discrete components, as indicated. Microprocessor 24 could, however, be utilized, using appropriate software and/or firmware, to perform the functions of the correction unit and comparator. In addition, the microprocessor, correction unit and comparator can be realized as a single integrated circuit using methods well known to experts in the art of digital hardware design.

The time interval between changes to the parameters that are used to control correction unit 12 by microprocessor 24 can be substantial. It is governed by the maximum output error that can be tolerated (on output line 14), by the comparison measurement noise, by the environment, and by the performance of oscillator/clock unit 11 (that is, its level of random noise and its environmental sensitivity). This makes the best possible use of both the oscillator performance and the calibration data, since the time offset, rate offset and frequency drift of oscillator 11 are optimally estimated and accounted for (while in the presence of the random variations in oscillator output).

Since requests for data from the time reference source 21 can normally be infrequent utilizing this invention, a variety of transmission links can be used to implement transmission link 22, and may include, for example, dedicated telephone wires, electromagnetic, optical or acoustic (ultrasonic for example) transmissions, satellite time transmissions, portable or cellular telephones, ancillary signals on commercial broadcasts, or the use of the Automated Computer Time Service (ACTS) provided by the National Institute of Standards and Technology might all be used. The ACTS service is particularly suitable for this application since it provides advance notice of leap seconds and of the changes to and from daylight saving time.

As brought out above, correction unit 12 may be a separate unit from microprocessor 24 and, if so, is preferably a second or third order servo as above described. As also brought out above, microprocessor 24 can, however, be utilized to implement the correction unit through use of appropriate software and/or firmware. In this case, the correction algorithm implemented by microprocessor 24 together with memory 25, is, in effect, a digital implementation of the second, third or higher order servo described in the articles, "An Analysis of a Low Information Rate Time Control Unit" and "An Ultra-Precise Time Synchronization System Designed by Computer Simulation", hereinabove referenced. The integrations required for the second or third order loops and the summing accumulators wherein the composite correction signal is computed from the outputs of the various integrators can all be implemented within the registers of the microprocessor and its ancillary components in a way well known to those who are skilled in the art of digital hardware design.

As a result of the operation of the correction algorithm, the output signal, on line 14, is controlled using optimal time, frequency and frequency drift predictions, which may include estimates for the effects of environmental perturbations, such as temperature or supply voltage. The microprocessor also makes optimal use (based on the required accuracy of the output, on line 14, and the quality of oscillator 11) of the external calibration data as provided by the time reference source 21.

A chart showing steady-state operation is illustrated in FIG. 3. The simplified algorithm of this invention, as shown and discussed in FIG. 3, is specifically illustrated using a model appropriate to a quartz crystal oscillator and is for illustrative purposes only. The device could be realized using any other type of oscillator producing a clock output, and more complex algorithms, incorporating additional parameters, could be constructed as obvious extensions of the invention, and the invention is therefore not meant to be limited to the specific illustration utilized.

In the simplified illustration shown in FIG. 3, the k-th difference between the corrected internal clock and the standard clock is measured at time $t_k$ and is denoted by $e(t_k)$. The interval between $t_k$ and $t_{k-1}$ is $\tau_{min}$. It is computed as part of the algorithm to be long enough so that the measurement noise is less than the clock noise in steady state (it may be relatively short in the start-up phase when the model parameters are not well known and is increased to match the increase in the accuracy of the model predictions as the steady-state is reached). If it is desired that measurements be taken more often, the algorithm is modified to average the measurement noise with respect to the clock noise in an optimum way.

The measured difference is compared to the optimal estimate of the RMS error of the clock over the prediction interval $\tau_{min}$ as computed from previous measurements, denoted as $\sigma_{k-1}$. The parameter "C" is the desired confidence interval. If the measured difference is too large, then the algorithm differentiates between transmission errors between the external reference and the comparator and time and/or frequency steps of the internal standard. Transmission errors are detected by a request for an immediate repeat of the comparison while time and/or frequency steps result in appropriate modifications to the internal model parameters.

In this illustration, the model parameters comprise the normalized frequency offset, $y_k$, the frequency drift, $D_k$, and the RMS time error of the measurements, $\sigma_k$. These parameters are used to predict the performance of the device at time $\tau$ in the future. Depending on the details of the device, the estimated time offset of the clock may be applied directly to the output of the device, or the offset may be transmitted via an ancillary channel or displayed or utilized in any other suitable way.

A prototype device according to this invention has been tested in comparison with a random-walk FM model, and the root-mean-square (RMS) error was found to be typically less than 100 ns (nanoseconds) for a 100 s (seconds) prediction interval. The RMS error increased as the 3/2 power of the prediction interval for longer times ($\alpha = -2$ in the stochastic noise model at equation 2 above). The prediction error was 0.6 milliseconds RMS after 1 day and 0.1 seconds after one month.

If the desired time uncertainty is to be 0.1 seconds (RMS) or less, this requirement could be satisfied using an external time comparison only once per month. The error of the clock depicted in FIG. 1 could therefore be reduced by a factor of more than 100 by making optimum use of only a single, external comparison during the 30-day period shown in FIG. 1. The time required to make the comparison depends on the transmission mode. For example, when the NIST ACTS service is utilized the time required is usually a few seconds. These capabilities were confirmed using several clocks constructed using inexpensive ordinary quartz-crystal oscillators.

The algorithm preferably used in actual prototype devices is more complex, and is divided into different phases, as illustrated by the flow charts of FIGS. 4A through 4G (FIG. 4A illustrates start-up and initialization, FIG. 4B illustrates steady-state loop, FIG. 4C illustrates rejection type 1, FIG. 4D illustrates rejection type 2, FIG. 4E illustrates rejection type 3, FIG. 4F illustrates communications failure, and FIG. 4G illustrates a subroutine for reading external reference time).

In the start-up phase of the device, shown in FIG. 4A, three comparisons, each separated by a time $\tau_{min}$, are made between the internal time of the device and the time of the external reference. The initial time between measurements is set to be long enough so that the measurement noise is small compared to an initial estimate of the capabilities of the device. The internal time can be set correctly after the first measurement, the first estimate of the frequency is made after the second one, and a first estimate of the drift in frequency can be made after the third measurement. Since only three measurements have been made, the device is not yet able to estimate the other parameters.

The algorithm continues with its steady-state phase, which is shown in FIG. 4B. At the start of the steady-state phase, the predictive power of the model is still relatively poor and the time interval between external calibrations is accordingly relatively short. This initial interval is estimated from the stability characteristics of the oscillator, from the maximum allowable error for the device, from the uncertainty in measuring the external standard, and from the cost of each comparison.

When this interval has elapsed, a comparison between the internal time and the external standard is initiated. If both the current measured difference and the previous one are statistically acceptable, then these data are used to update the model parameters and the model is used to compute the correction to the free-running time and frequency of associated oscillator/clock unit.

As the predictive power of the model improves, the time between comparisons can be increased (while maintaining the same average error) or the average error of the device can be reduced (by maintaining the same time between comparisons). The choice between these two possibilities is governed by the balance between desired accuracy and the cost of external comparisons. When the specified delay has elapsed, the process is repeated.

If either the current or the previous measurements were rejected, then rejection tests are commenced. If the current measurement was rejected, but the previous measurement was acceptable (See FIG. 4C), then a second "quick" comparison is immediately initiated and the statistical tests are repeated. If the second "quick" comparison is accepted, then the rejection of the first current measurement is modeled as a transmission error. The second "quick" comparison is used as a valid estimate before returning to the steady-state loop.

If the previous measurement was acceptable but both the current measurement and its "quick" repeat are rejected, then there are two possibilities. If the current measurement and its "quick" repeat agree in a statistical sense, then both measurements are modeled as valid and the associated oscillator/clock unit may have experienced a step in time and/or in frequency with respect to the external reference. If so, the time of the clock is reset, and this fact is stored before returning to the main loop.

If the current measurement and its "quick" repeat disagree in a statistically significant way, then a serious error has occurred in the device or the noise in the transmission or comparison processes is too high to support the desired accuracy. If so, a flag is set to indicate this, followed by a return to the start-up mode to try to re-initialize the device. If this problem re-appears, then either the device has failed or the specified tolerances are inconsistent with the fundamental noise of the device or of the transmission and comparison procedure.

If the current measurement (or its "quick" repeat) is acceptable, but the previous measurement was rejected (See FIGS. 4B through 4E), and if that previous rejection was modeled as a time step, then that assumption is now confirmed since the reset of the clock restored the device to statistically acceptable behavior. The time step is incorporated into the time of the device and the normal operating loop is resumed.

If the current measurement and its "quick" repeat are consistent, and both rejected, and if the previous measurement and its "quick" repeat were consistent, and both rejected (See FIG. 4D), then the local device may have experienced a frequency step (in addition to a possible time step). New estimates are computed for both the frequency and the time of the local device using the previous and current measurements.

If the performance of the device is acceptable at the next measurement, then the steps are incorporated into the model and the operation returns to the normal loop. If the performance cannot be made acceptable using both a frequency step and a time step, then a serious error has occurred. A flag is set to indicate this, followed by a return to the start-up mode to try to re-initialize the device. If this problem again reappears, then the device has failed. At this point it is possible to fall-back to a free-running mode (as is currently available on the market) and set an unhealthy flag to inform the user. In any case, the time can be reset, which will provide some time accuracy enhancement.

A similar situation can arise if the external calibrations become unavailable (See FIG. 4F). As shown in FIG. 4G, the algorithm will also enter this mode if the external calibration data repeatedly fail format, checksum or other checks for internal consistency.

The device of this invention has been implemented in a small computer and has been used to correct the clock in the computer. This internal clock was implemented as a crystal-controlled oscillator connected to a counter. This oscillator initially exhibited a frequency offset of 4.022 seconds/day and a drift in frequency of 0.6% per day.

If the time of this clock was corrected using only the parameters in equation (1), the flicker and random-walk frequency modulations results in residual root-mean-square (RMS) time errors of 122 milliseconds after 1 day. When the device and method of this invention were used, however, the RMS time error was reduced to 5.3 milliseconds after 1 day, and the average error was 3.1 milliseconds. As discussed above, a tradeoff could be made between desired accuracy and the time between external calibrations.

As can be appreciated from the foregoing, this invention provides an improved device and method for enhancing the accuracy of the output of a unit, and particularly for enhancing the frequency and/or time output of an oscillator/clock unit.

What is claimed is:

1. A method for enhancing accuracy of an output of a unit utilized with a utilization network, the output of the unit having an accuracy which departs over time from a predetermined standard, said method comprising:

receiving the output of the unit;

establishing predicted variations of the output of the unit due to random deviations and systematic time offsets and based upon a comparison of said output of said unit with a reference input indicative of the predetermined standard;

utilizing said predicted variations to modify the received output of the unit to thereby provide an accuracy enhanced output that is developed from the output of the unit with said accuracy enhanced output varying from the received output of the unit based upon said predicted variations;

repeatedly comparing said accuracy enhanced output to the reference input indicative of the predetermined standard to thereby maintain one of a preselected accuracy when later ones of said comparisons are timewise less frequent than are earlier ones of said comparisons and improved accuracy when comparisons are timewise of substantially the same frequency;

utilizing each of said comparisons to update said established predicted variations; and providing said accuracy enhanced output to the utilization network.

2. The method of claim 1 wherein said established predicted variations are improved over time due to repeated updating of said variations.

3. The method of claim 1 wherein said step of establishing predicted variations includes establishing predicted variations due to random deviations arising from flicker noise frequency modulation and random-walk frequency modulation.

4. The method of claim 1 wherein said step of establishing predicted variations of the unit output is accomplished by use of a microprocessor having a memory, and storing said predicted variations in said memory.

5. The method of claim 4 wherein said method includes executing an algorithm for causing said microprocessor to calculate said predicted variations and update said predicted variations.

6. The method of claim 5 wherein said algorithm models said random deviations of said predicted variations, and wherein said microprocessor calculates said systematic time offsets of said predicted variations at least partly based upon said random deviations.

7. A device having an accuracy enhanced output provided to a utilization network and a reference input indicative of a predetermined standard, said device comprising:

a unit providing an output, accuracy of which departs over time from the predetermined standard;

input means for receiving the reference input indicative of the predetermined standard;

output means for providing the accuracy enhanced output; and processor means for establishing predicted accuracy variations of said output of said unit due to random deviations and systematic time offsets and based upon a comparison of said output of said unit with said reference input, said processor means being connected with said unit to receive said output therefrom and with said output means to provide as an output at said output means the accuracy enhanced output with said accuracy enhanced output varying from said output being provided from said unit based upon said established predicted accuracy variations, and said processor means being connected with said input means to receive the reference input and with said output means to receive the reference enhanced output and comparing the reference input with the accuracy enhanced output for updating said established predicted accuracy variations upon receipt of the reference input by said input means.

8. The device of claim 7 wherein the reference input includes one of correct time and correct frequency.

9. The device of claim 7 wherein said processor means is a microprocessor and wherein said microprocessor utilizes an algorithm responsive to said random deviations and said systematic time offsets to calculate and update said predicted accuracy variations.

10. The device of claim 7 wherein said predicted variations established by said processor means includes at least one of prediction of time and frequency offset, frequency drift, time dispersion characteristics of the unit, environmental sensitivity of the unit, and average and instantaneous errors.

11. The device of claim 7 wherein said device is an electronic device and wherein said accuracy enhanced output is an electrical output signal with said electrical output signal being one of a pulsed output, a continuous frequency output, a coded time signal, an analog output, a digital output and a modulated output.

12. The device of claim 7 wherein said device includes measuring means for measuring environmental perturbations and having an output indicative thereof provided to said processor means for further refining said predicted accuracy variations.

13. The device of claim 7 wherein the utilization network includes a unit having a readable display.

14. The device of claim 7 wherein said unit is one of a clock and an oscillator.

15. The device of claim 14 wherein said oscillator includes one of a quartz crystal oscillator, a rubidium oscillator, a cesium oscillator, and a hydrogen maser oscillator.

16. The device of claim 7 wherein said input means is connected through a transmission link to a source to receive the reference input.

17. The device of claim 16 wherein said transmission link includes at least one of direct wire connection, telephonic connection, and wireless connection.

18. The device of claim 7 wherein said processor means includes prediction means for establishing said predicted accuracy variations of said output of said unit, correction means connected with said unit and with said prediction means for providing accuracy corrections to said output of said unit, and comparison means connected with said input means for receiving said reference input and with said output means for receiving said accuracy enhanced output and, responsive to a comparison thereof, providing an output indicative of accuracy error, said comparison means also being connected with said prediction means to provide said output indicative of accuracy error thereto for selective updating of said predicted accuracy variations by said prediction means.

19. The device of claim 18 wherein said processor means is a microprocessor for repeatedly causing said comparison means to compare said accuracy enhanced output with said reference input to thereby maintain one of a predetermined accuracy when later ones of said comparisons are timewise less frequent than are earlier ones of said comparisons and improved accuracy when comparisons are timewise of substantially the same frequency.

20. The device of claim 18 wherein said correction means includes servo means.

21. The device of claim 20 wherein said servo means is a low information rate digital servo.

22. A device having an accuracy enhanced electrical signal output and a reference input indicative of a predetermined standard, said device comprising:

an oscillator/clock unit having an electrical signal output, accuracy of which departs over time from the predetermined standard;

input means for receiving the reference input indicative of the predetermined standard;

processor means including a microprocessor for determining predicted accuracy variations of said output of said unit due to random deviations and systematic time offsets and based upon a comparison of said output of said unit with said reference input, said processor means being connected with said unit to receive said output therefrom and developing as an output from said processor means the accuracy enhanced electrical signal output that varies from said output from said unit based upon said predicted accuracy variations due to said random deviations and systematic time offsets as determined by said processor means, and said processor means also being connected with said input means to receive the reference input and comparing the reference input with the accuracy enhanced electrical signal output for updating said predicted accuracy variations upon receipt of the reference input by said input means; and transmission link means connected with said processor means for receiving said accuracy enhanced electrical signal output from said processor means and coupling the accuracy enhanced electrical signal output to a utilization device connected with said transmission link means.

23. The device of claim 22 wherein said processor means also includes correction means connected with said unit and with said microprocessor for providing accuracy corrections to said output of said unit so that the accuracy enhanced electrical signal output is derived, and comparison means connected with said input means for receiving the reference input and with said correcting means for comparing the accuracy enhanced electrical signal output with the reference input and, responsive thereto, providing an output indicative of accuracy error, said comparison means also being connected with said microprocessor to provide said output indicative of accuracy error thereto for updating said predicted accuracy variations by said microprocessor.

24. The device of claim 23 wherein said correction means includes servo means.

* * * * *